July 15, 1924.
K. CRITTENDEN
CURRENT REGULATOR
Filed Jan. 16, 1922
1,501,395
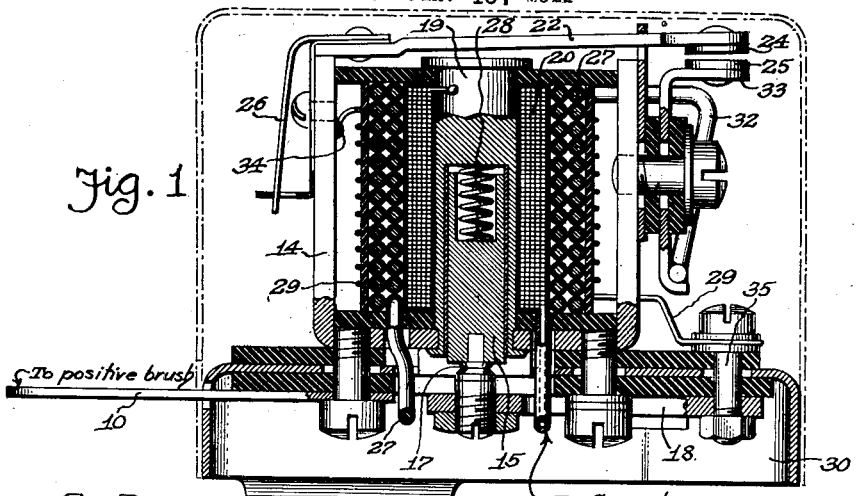
Fig. 1
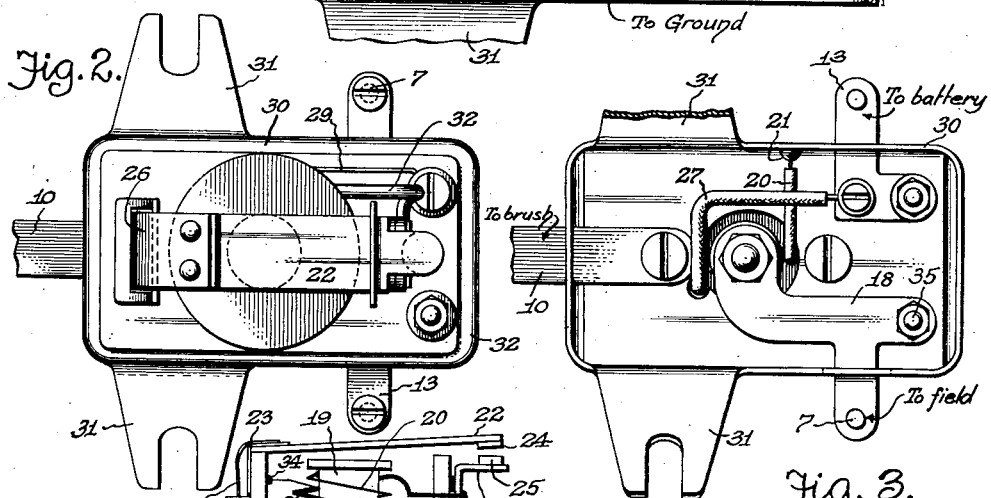
Fig. 2.
Fig. 3.
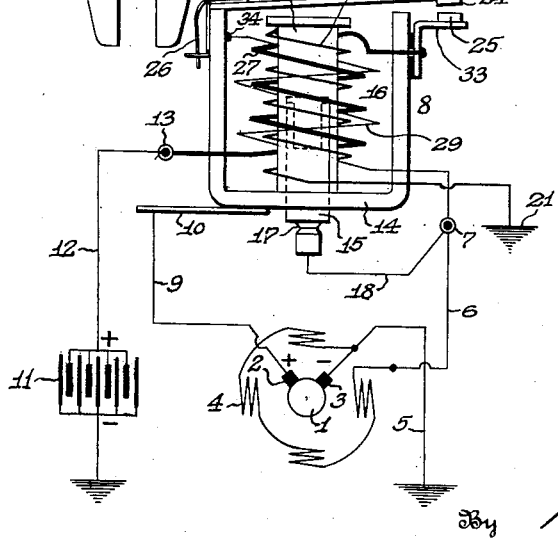
Fig. 4.
Inventor
Kenneth Crittenden,
By
Attorneys Patented July 15, 1924.

1,501,395

UNITED STATES PATENT OFFICE.

KENNETH CRITTENDEN, OF HIGHLAND PARK, MICHIGAN.

CURRENT REGULATOR.

Application filed January 16, 1922. Serial No. 529,515.

*To all whom it may concern:*

Be it known that I, KENNETH CRITTENDEN, a citizen of the United States of America, residing at Highland Park, in the county of Wayne and State of Michigan, have invented certain new and useful Improvements in Current Regulators, of which the following is a specification, reference being had therein to the accompanying drawings.

This invention relates to means for automatically regulating the current output of a generator, and more particularly to a current regulator and cut-out for battery charging circuits especially designed for installation in lighting, ignition, and other systems usually employing an internal combustion engine as the prime mover for driving the generator.

An object of the invention is to effect an automatic and accurate regulation of the generator current output and battery charging rate. A further object is to provide an automatic battery cut-out in connection with such generator regulating means and to provide a device of simple construction which is compact in its arrangement and efficient in operation, being especially adapted for use in connection with a shunt wound generator for battery charging circuits of motor vehicles.

With the above and other ends in view, the invention consists in providing a variable resistance for varying the field current of the generator and in establishing a magnetic balance for controlling the variable resistance in accordance with variations in the speed of the generator armature.

The invention also consists in providing certain other new and useful features and in the construction and arrangement of parts, all as hereinafter more fully described and particularly set forth in the appended claims, reference being had to the accompanying drawing, in which Figure 1 is a longitudinal vertical section through a device illustrative of the invention;

Fig. 2 is a top plan view of the same;

Fig. 3 is a bottom plan view, and

Fig. 4 is a wiring diagram.

As shown in Fig. 4, 1 indicates the armature shaft of a shunt wound generator, 2 the positive brush, and 3 the negative brush of the generator. 4 indicates the field winding of the generator which is connected at one end to the ground wire 5 of the negative brush and the opposite end of the winding is connected by the wire 6 to the terminal 7 of the controlling device which is indicated as a whole by the numeral 8. The positive brush 2 of the generator is connected by a wire 9 to a terminal or lead 10 of the controlling device and a storage battery 11 is connected by the wire 12 to the terminal 13 of the controlling device.

Describing in general the construction and operation of the device embodying the invention, and referring particularly to Fig. 4 of the drawing:—When the prime mover (not shown) for driving the generator armature is started, the slight current from the residue of magnetism in the pole pieces of the generator is collected by the generator commutator and flows to the positive brush 2, thence through the lead 9 to the frame 14 of the controlling device; and from said frame to the movable core or plunger 15 of a magnetic device or solenoid indicated as a whole by the numeral 16, and which solenoid is mounted upon the frame 14. The current then passes through the contacts 17, one of which is carried by the plunger and the other by the frame, and through the lead 18 to the terminal 7 from which it flows through the wire 6 to the field coils 4, and from said field coils to the grounded negative brush 3 of the generator. This circuit is the direct path of the least resistance for the field current, making a direct shunt circuit for the generator. As the speed of the armature increases, voltage builds up to a point where it exceeds that of the battery, and the current flowing through the frame 14 and stationary core 19 of the solenoid 16, passes through a shunt coil 20 which is wound upon the core with one end connected to the core and its opposite end grounded, as shown at 21. This shunt coil is of high resistance and the small percentage of current passing through it creates a magnetic pull upon the armature 22 which extends across the upper end of the core 19 and is pivoted at one end, as at 23, to a side leg of the frame 14, its opposite end carrying a contact 24 to engage a like contact 25 carried by the opposite side leg of the frame. This electro-magnet formed by the winding of the high resistance shunt coil 20 upon the core 19, thus serves to operate the armature 22 against the action of a spring 26 and close the circuit through a low resistance series coil 27 which is also wound upon the core 19 outside of the coil 20, one end of this series coil 27 being electrically connected to the contact 25 and its opposite end, to the terminal 13, which terminal is connected to the battery 11 by the lead 12, so that when the speed of the generator armature reaches a predetermined charging rate, the electromagnet will operate to close the battery circuit and after the circuit is closed by the armature 22, said armature will be held closed not only by the pull thereon caused by current passing through the shunt coil 20 but also by the current passing through the low resistance series coil 27 to the battery.

Further increase in speed of the generator armature causes a further increase in current which rapidly builds up to a predetermined battery charging rate, when the magnetic pull on the plunger or movable core 15 caused by the passage of current through the coils 20 and 27, will tend to separate the contacts 17 which are connected in the direct circuit of the generator field, and as these contacts are preferably of a very high resistance material, such as tungsten, the variations in the force with which these contacts are pressed together, will provide a variable resistance in the field current of the generator. The contacts 17 are normally held in engagement with each other by a spring 28 (see Fig. 1) which is located within a bore in the inner end of the plunger 15 and exerts a force to hold the plunger moved endwise from the core of the magnet into engagement with the contact 17 which is connected by the lead 18 to the terminal 7, and therefore increase in current passing through the coils 20 and 27 will increase the magnetic pull upon the plunger 15 in opposition to the spring 28, thereby varying the force with which the contacts 17 are held together, and this variation in force provides a variable resistance within the field circuit of the generator to control or vary the current output of the generator.

A resistance coil 29 is also connected in the generator field circuit, in parallel with the contacts 17, said resistance coil being, for the purpose of convenience and compactness of arrangement, wound about the coils 20 and 27, but in a reverse direction, one end of said coil 29 being connected to the frame 14 and its opposite end electrically connected to the terminal 7, to which terminal, the lead 18 from the stationary contact 17 is also connected. A portion of the field current therefore flows through the frame 14 and thence through the resistance coil 29 in a reverse direction to the flow of current through the low resistance coil 27 and shunt coil 20, and therefore, the magnetic pull of the coil 29 normally opposes the action of the shunt coil 20 and series coil 27 to momentarily resist the separation of the contacts 17. A magnetic balance is therefore set up between the windings of the solenoid and the spring 28 which will give constant voltage and current from positive to negative brushes of the generator, by varying the field current with the speed of the armature through the variable resistance set up within the field circuit by varying the contact pressure of the contacts 17. A constant current output of the generator is therefore maintained until the speed of the generator armature reaches a predetermined point, which will be the maximum battery charging rate, when the magnetic pull of the series coil 27 and the shunt coil 20 will be sufficient to overcome the bucking action of the coil 29 and the mechanical resistance of the spring 28, and the contact points 17 will be separated. This will reduce the charging rate of the generator by cutting down the field current to the flow through the resistance coil 29. When the speed of the generator armature decreases so that the voltage generated falls below battery voltage, current will flow back from the battery through the series coil 27, changing the polarity of this coil so that it will buck or oppose the shunt coil 20 which is very weak because of the low voltage which is being generated, and therefore, the pull of the electromagnet will be reduced to such an extent that it will be overcome by the action of the spring 26 and the armature 22 will move away from the end of the magnet, separating the contacts 24 and 25 and breaking the circuit of the coil 27 which is the battery circuit, thereby cutting out the battery.

In order to provide a simple device having a compact arrangement which is particularly applicable for use in connection with generators commonly employed for generating battery charging current in motor vehicle constructions, a specific form and arrangement of parts which have been previously described in a general way, is shown in Figs. 1 to 3 inclusive, of the drawing. This specific embodiment of the invention comprises a base or supporting frame 30 which is provided with suitable laterally extending supporting legs 31 by means of which the device may be conveniently attached to a casing of a generator. Mounted upon this base and suitably insulated therefrom, is the U-shaped frame 14 and arranged centrally within this frame is the fixed core 19 of the electro-magnet, the lower end of this core extending through an opening in the horizontal member of the frame 14 and electrically connected with the frame. The core is bored inwardly from its lower end to receive the movable core or plunger 15, which plunger projects beyond the lower end of the fixed core and carries one of the contacts 17, the fixed opposing contact being carried by the base 30, but insulated from the base. The inner end of the plunger 15 is bored axially to receive the spring 28 which is interposed between the inner end of this bore and the inner end of the bore of the core 19. Wound directly upon the fixed core 19, is the shunt coil 20 with one end of the coil electrically connected to the core and its opposite end leading through the base and grounded thereon, as shown at 21, in Fig. 3. The low resistance series coil 27 is wound outside the shunt coil with one end connected by a lead 32 to a suitable bracket 33 carried by a side leg of the frame 14 and insulated therefrom, said bracket forming a support for the contact member 25. The opposite end of the coil 27 is led out through an opening in the base 30 and across the base to a member carried by the base and insulated therefrom and forming the terminal 13 to which the lead 12 running to the battery is connected. The high resistance coil 29 of fine wire is wound outside the coil 27 with one end of the wire 29 electrically connected to a side leg of the frame, as at 34 and through this frame, the terminal 10 and wire 9, with the positive brush of the generator. The opposite end of this wire forming the coil 29 is led to a post 35 carried by the base 30 and insulated therefrom and to which post the fixed contact 17 is electrically connected by the lead or member 18 which has a laterally extending arm forming the terminal 7 to which the wire 6 leading to the generator field, is attached.

By arranging the contacts 17 at one end of the movable core or plunger of the electro-magnet, arcing at these contact points is practically eliminated by the action of the magnetic lines of force which pass around the end of the plunger through the gap between the contacts, and thus an action similar to a magnetic blow out coil is secured, which effectually prevents arcing and the burning of the contact points.

It is not essential to the operation of this device that the resistance coil 29 be wound for opposite polarity to that of the shunt coil 20 and series coil 27 nor is it essential that the resistance coil 29 be wound upon the other coils, but it may be in the form of a separate and distinct resistance coil located at any convenient point and connected in parallel with the variable resistance element or contacts 17 within the generator field circuit.

Further, the device may be used simply as a current regulator by eliminating the battery cut out for armature 22. Other changes in the construction and arrangement of the parts may be made, within the scope of the appended claims, without departing from the spirit of the invention, and I do not therefore limit myself to the particular construction shown.

Having thus fully described my invention, what I claim is:—

1. A device of the character described comprising a U-shaped frame having an opening in the horizontal member thereof, a fixed core mounted upon said frame with one end secured within said opening and extending therethrough, a movable core within the fixed core and extending through the opening in the frame, a low resistance series coil wound upon the fixed core for connection in a battery circuit, an armature on the frame and extending across an end of the fixed core and connected in a battery circuit to open and close the same, a shunt coil wound upon the fixed core with one end electrically connected to the core and its opposite end grounded, variable resistance means for connection within a field circuit, and comprising a fixed contact member carried by the frame, and a movable contact member carried by the movable core, and a high resistance coil connected in the field circuit in parallel with said variable resistance means.

2. A device of the character described comprising a U-shaped frame, a hollow fixed core mounted in the frame, a movable core in the fixed core, a spring to resist the movement of the movable core in one direction of its movement, a low resistance series coil wound upon the fixed core, a shunt coil upon the fixed core, an armature carried by the frame and adapted to be operated by the magnetic effect of current passing through said coils, said armature being connected within the circuit of the low resistance coil to open and close said circuit, a spring to resist the movement of the armature against the magnetic pull thereon, variable resistance means for connection within a field circuit of a generator and comprising a fixed contact and a co-operating movable contact carried by the movable core, and a high resistance coil for connection in the field circuit in parallel with said variable resistance means.

3. A device of the character described comprising a base, a U-shaped frame mounted upon the base and insulated therefrom, said frame having an opening in its horizontal portion, a fixed core carried by the frame with one end secured within and extending through the opening in the frame, a movable core in the fixed core, with one end of the movable core projecting from the fixed core, a spring to resist the movement of the movable core in one direction, a shunt coil wound upon the fixed core with one end electrically connected with the core and the opposite end to the ground, a low resistance series coil wound upon the fixed core with one end adapted for connection to a battery circuit, a contact member on the frame to which the opposite end of the series coil is connected, an armature extending across the frame and across the upper end of the fixed core to move toward and from the core and having a contact to engage the contact member on the frame, variable resistance means for connection within a field circuit of a generator and comprising a fixed contact and a co-operating movable contact carried by the movable core, and a high resistance coil connected in parallel with said variable resistance means, said high resistance coil being wound upon the series coil and shunt coil, with one end of said high resistance coil connected to the frame and its opposite end adapted for connection in the field circuit.

In testimony whereof I affix my signature in presence of two witnesses.

KENNETH CRITTENDEN.

Witnesses:
 ANNA M. DORR,
 LEWIS E. FLANDERS.